Sept. 15, 1942.    G. L. STORM    2,295,975
RADIOGRAPHIC EQUIPMENT
Filed March 30, 1940    2 Sheets-Sheet 1
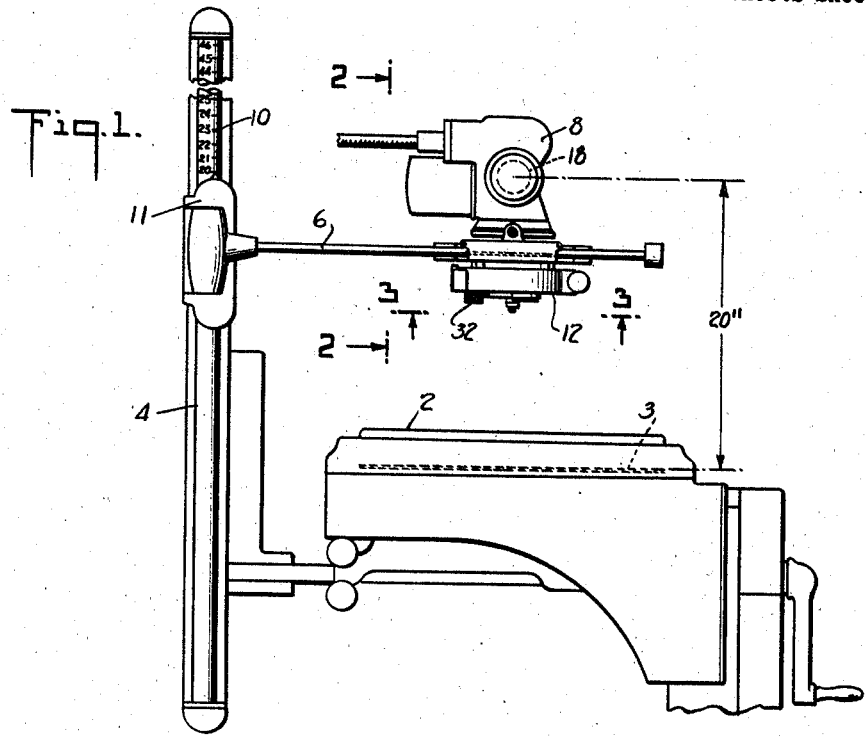
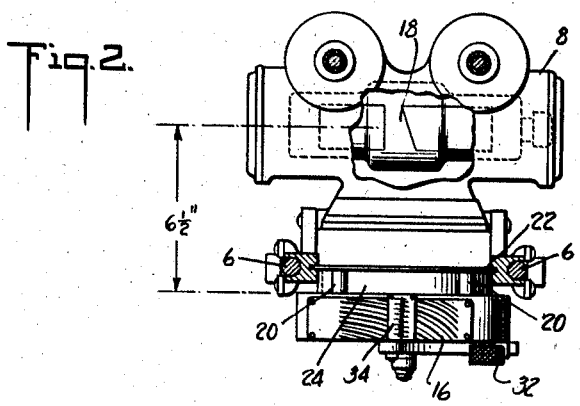
INVENTOR
GEORGE L. STORM
BY
Bartlett, Eyre, Scott & Keel
ATTORNEYS Sept. 15, 1942.  G. L. STORM  2,295,975
RADIOGRAPHIC EQUIPMENT
Filed March 30, 1940  2 Sheets-Sheet 2

INVENTOR
GEORGE L. STORM
BY
Bartlett, Eyre, Scott & Keel
ATTORNEYS

Patented Sept. 15, 1942

2,295,975

UNITED STATES PATENT OFFICE 2,295,975

RADIOGRAPHIC EQUIPMENT

George L. Storm, West Orange, N. J., assignor of one-half to Arthur Wright, Essex Fells, N. J.

Application March 30, 1940, Serial No. 326,839

15 Claims. (Cl. 250—105)

The present invention relates to X-ray apparatus of the type used for diagnostic photography and comprises improved equipment for such machines that improves the accuracy of focus and eliminates guesswork in the area to be exposed to the rays. The invention provides a compact and unitary device which may be used in conjunction with standard apparatus and which is adjustable to give any desired area of exposure for any distance of target to film. The device of the present invention eliminates compression cones or cups which the skilled operator now generally employs in X-ray photography and substitutes therefor a single adjustable device of greater accuracy and flexibility. With the now used cups, the operator, for a given distance of target to film, can select only that cup which will give a size of exposure on the film nearest to that desired. With the device of the present invention an exposure of the exact size desired is immediately obtainable without removal or substitution of any part of the machine.

For a better understanding of the invention, reference may be had to the accompanying drawings, of which:

Fig. 1 is a side view of an X-ray apparatus provided with the novel focusing equipment;

Fig. 2 is an enlarged view, partly broken away, of the tube and focusing device, taken along the line 2—2 of Fig. 1;

Figure 3:
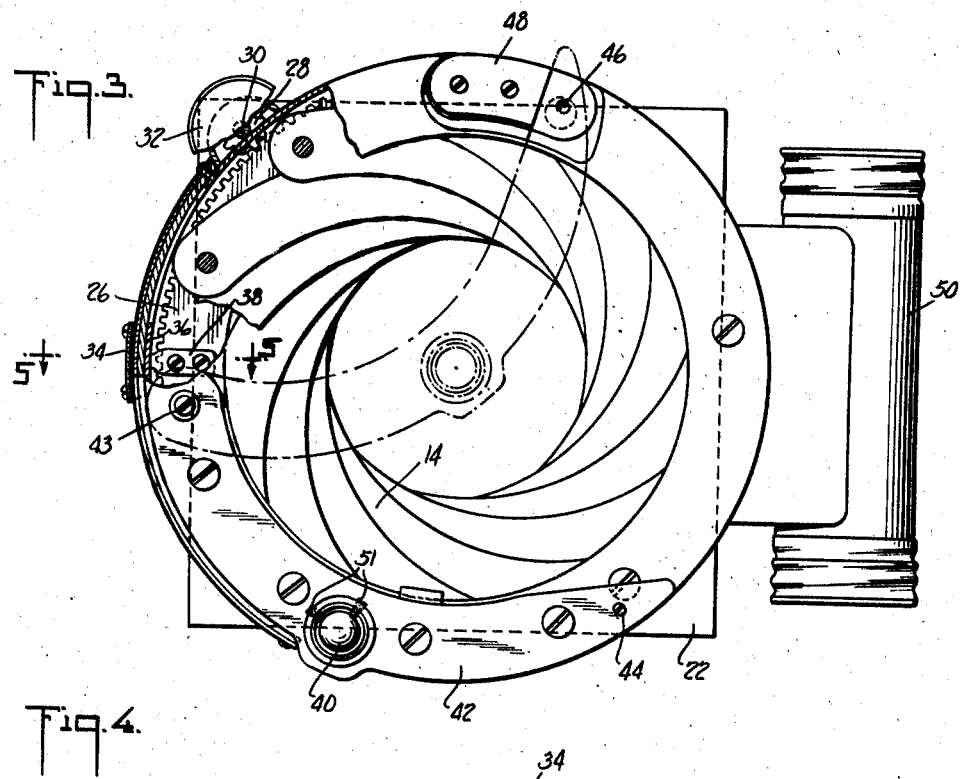
Fig. 3 is an enlarged bottom plan view of the focusing device, partly broken away and taken along the line 3—3 of Fig. 1.

In Fig. 1 is shown a conventional X-ray apparatus including the table 2, having the slot for reception of the sensitized plate or film 3, upright 4, along which the cross arms 6 are vertically adjustable, and tube housing 8. The scale 10 on the upright 4, in conjunction with an indicator on the support 11 for the arms 6, gives the vertical distance between the target and film. In accordance with the invention, a generally cylindrical housing 12 containing diaphragm 14 (Fig. 3) and having a scale 16 on the outside thereof is mounted on the horizontal arms 6 with the center of the diaphragm in vertical alinement with the target 18 (Fig. 2). The housing 12 may be mounted on the arms 6 in any suitable manner. In the particular embodiment of the invention illustrated, the housing 12 is secured by posts 20 to a centrally apertured plate 22, the edges of which rest in grooves in the tube supporting structure. A cylindrical lead lined collar 24 between the plate 22 and housing 12 prevents stray emission of X-rays between the target and diaphragm. As hereinafter described, this collar is not essential and is provided for spacing purposes only.

In the particular embodiment of the invention illustrated, the diaphragm 14 is an iris diaphragm which exposes any desired size of circular area of the film to the X-rays. Any other diaphragm having a controllable aperture could be employed, if desired, to produce any desired shape of exposure. The iris diaphragm 14 is made of a plurality of sheets or leaves of lead or other material impervious to X-rays and is operated by a ring 26 having peripheral teeth thereon meshing with a pinion gear 28. Gear 28 is fixed to a shaft 30 carrying a knurled knob 32 for operating the diaphragm. For strengthening the leaves of the diaphragm and for insuring proper movement thereof, a layer of nickel silver or the like may be provided on each side of each leaf if desired.

Figure 4:
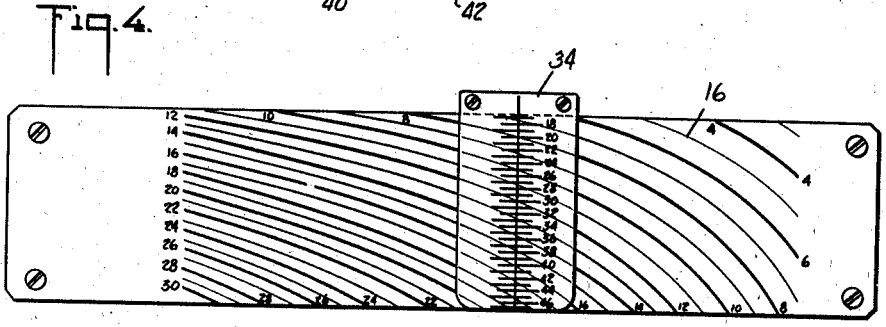
Fig. 4 is an enlarged view of the scale and index used for determining the area of exposure.
Figure 5:
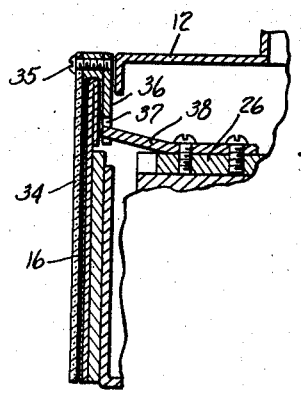
Fig. 5 is a sectional view taken along the line 5—5 of Fig. 3 showing the mounting of the scale indicator.

The scale 16 on the housing 12 comprises a plurality of empirically determined curved lines numbered to correspond with diameters of the areas to be exposed on the film 3 and a transparent index 34 having horizontal gradations thereon numbered to correspond with distances from target to film. The index 34, as shown best in Fig. 5, is secured at its upper end by means of a screw 35 to a ring 36 having a slot 37 therein, which cooperates with a finger 38 secured to the operating ring 26. In this manner, when the ring 26 is turned by the knob 32 to vary the opening of the diaphragm 14, the index 34 is correspondingly moved along the scale 16. The scale is so calibrated with reference to the index and aperture of diaphragm that the area of exposure on the film 3 can be read directly for each distance of target to film. For example, with a distance of 20 inches between the target and film, as indicated in Fig. 1, the horizontal line marked 20 on the index 34 (Fig. 4) crosses the curved line numbered 8. This means that the aperture of the diaphragm is such as to give an eight inch diameter circular exposure to the sensitive plate or film 3. Similarly, if the vertical distance is 30 inches, the diameter of the exposed film will be 12 inches; if the distance is 40 inches, the diameter of exposed film 16 inches. Thus, when the operator desires, for example, a 10 inch diameter exposure at a vertical distance of 30 inches, he need only position the arms 6 until the scale 10 indicates the correct vertical distance, and then manipulate the knob 32 until the line marked 30 on the index 34 crosses the curve marked 10 on the scale, at which time the diaphragm opening will be that desired.

The curved lines of the scale are found empirically by any well known method. For example, the housing 12 before assembly with an X-ray machine can be positioned beneath a point source of light at a distance therefrom corresponding to that between target and housing, and the diameter of the lighted areas at different levels below the housing measured for different apertures of the diaphragm, or the curve can be plotted geometrically. A scale when once made may be used for any X-ray machine, provided the distance from target to the diaphragm is constant. In X-ray apparatus now in use, the distance from target to supporting cross arms is about five or six inches. If it is desired to use the same scale on different machines it is only necessary to calibrate the scale for a somewhat greater distance, for example, 6½ inches from target to top of housing, as indicated in Fig. 2, and then vary the depth of the collar 22 according to the dimensions of the particular machine. As heretofore indicated, the collar 22 might be omitted entirely, in which case, of course, the scale must be calibrated according to the dimensions of the machine with which it is to be used.

When a diaphragm having a rectangular or other non-circular aperture is used, instead of the iris diaphragm 14, the scale 16 is similarly calibrated, either empirically or geometrically, to give dimensions of the exposed area of the film for different openings of the diaphragm.

It is important for the operator not only to be able to set the diaphragm aperture correctly for the size of exposure desired but also to be able to center the exposure exactly. For this purpose the invention provides a centering light 40 which is mounted together with a suitable lens on a curved arm 42. Arm 42 is pivoted at one end on a pin 43 secured to the annular lower side of the housing 12 so as to swing in a horizontal plane across the central opening of the device. Arm 42 carries a contact 44 adjacent the free end thereof, which contact when the arm is swung across the central opening into the dotted position indicated in Fig. 3, engages a contact 46 on the upper side of a clip 48 secured to the housing. When the contacts 44 and 46 are in engagement, the light 40 is accurately centered in the opening and the lamp is lighted by current from a battery 50. The light from the lens throws a beam upon the table, telling the operator the exact central focus of the machine. As the filaments of standard small electric lamps now on the market are seldom centered within the bulb, care should be taken to insure that the bulb 40 will give a lighted spot directly beneath it. This may be arranged, for example, by mounting the bulb on a spring and adjusting its position by means of set-screws 51 until the beam is exactly vertical, or a directing tube of lucite could be employed if desired, in which case when a new bulb is inserted no new adjustment thereof would be required.

From the above description, taken with the drawings, it will be apparent that the invention comprises an efficient, compact and useful attachment for X-ray machines. The provision of the centering light in combination with an adjustable diaphragm simplifies the manipulation of the machine and increases the accuracy thereof.

The following is claimed:

1. Radiographic equipment for use with X-ray photographic apparatus, comprising a housing to be positioned between the target and film, a controllable aperture diaphragm within the housing, a scale on the outside of the housing having curves and indicia thereon indicative of areas of the film exposed to the target, an index cooperating with said scale and carrying indicia indicative of distances between target and film, and means for operating said diaphragm and index conjointly.

2. Radiographic equipment for use with X-ray photographic apparatus, comprising a housing to be positioned between the target and film, a controllable aperture diaphragm within the housing, a scale on the outside of the housing having curves and indicia thereon indicative of areas of the film exposed to the target, an index cooperating with said scale and carrying indicia indicative of distances between target and film, means for operating said diaphragm and index conjointly, an arm pivoted on said housing for oscillation in a plane at right angles to the axis of said diaphragm, a source of light on said arm and means for energizing said source only when said arm is in a position to bring said source in line with the center of said diaphragm, the focal point of the target and the film.

3. The combination with an X-ray machine having an X-ray tube mounted for adjustment toward and away from a film, of a focusing device for the rays comprising an apertured diaphragm of material impervious to the rays, means for varying the aperture of the diaphragm, a scale on the outside of said device and an index movable along said scale by said aperture varying means, said index and scale having cooperating indicia thereon for giving the dimensions of exposure on the film corresponding to the size of aperture of the diaphragm and the distance of the target to the film.

4. The combination with an X-ray machine having an X-ray tube mounted for adjustment toward and away from a film, of a focusing device for the rays comprising an apertured diaphragm of material impervious to the rays, means for varying the aperture of the diaphragm, a scale on the outside of said device and an index movable along said scale by said aperture varying means, said index and scale having cooperating indicia thereon for giving the dimensions of exposure on the film corresponding to the size of aperture of the diaphragm and the distance of the target to the film, an arm pivoted on said device for movement in a plane at right angles to the axis of the diaphragm, a lamp carried by said arm adapted when lighted to throw a beam of light toward the film and along the axis of the diaphragm and means for energizing said lamp in one position of said arm.

5. The combination with a radiographic machine including an X-ray tube having a target and mounted for adjustment toward and away from a sensitized surface, of means interposed between said target and surface at a fixed distance from said target for controlling the area of surface exposed to said target, and scale means cooperating with said last mentioned means and having indicator settings responsive to adjustments of the area controlling means for indicating the dimensions of exposure with relation to the distance of target to surface.

6. The combination with a radiographic machine including an X-ray tube having a target and mounted for adjustment toward and away from a sensitized surface, of means interposed between said target and surface at a fixed distance from said target for controlling the area of surface exposed to said target, and scale means cooperating with said last mentioned means and having indicator settings responsive to adjustments of the area controlling means for indicating the dimensions of exposure with relation to the distance of target to surface, said means for controlling the area of exposure comprising an iris diaphragm of material substantially impervious to X-rays.

7. The combination with a radiographic machine including an X-ray tube having a target and mounted for adjustment toward and away from a sensitized surface, of means interposed between said target and surface at a fixed distance from said target for controlling the area of surface exposed to said target, scale means cooperating with said last mentioned means and having indicator settings responsive to adjustments of the area controlling means for indicating the dimensions of exposure with relation to the distance of target to surface, and means for controllably illuminating the central spot of the area to be exposed to the target.

8. The combination with an X-ray machine of a focusing device for the X-rays comprising a cylindrical housing open at both ends, an apertured diaphragm of lead within the housing, an annular toothed member for operating said diaphragm to vary the aperture thereof, means accessible from without said housing for rotating said member to vary the central aperture of said diaphragm, a fixed scale on the outside of said housing having a plurality of curves thereon, a transparent index movable over said scale and having graduations thereon, and means coupling said index to said annular member for conjoint operation thereof whereby said curves on said scale and said graduations on said index may be calibrated to give information as to the area to be exposed to the X-rays by said diaphragm.

9. The combination with an X-ray machine having an X-ray tube mounted for adjustment toward and away from a film, of a focusing device for the rays comprising an apertured diaphragm of material impervious to the rays, means for varying the aperture of the diaphragm, a scale visible from without said device and an index movable along said scale by said aperture varying means, said index and scale having cooperating indicia thereon for giving the dimensions of exposure on the film corresponding to the size of aperture of the diaphragm and the distance of the target to the film.

10. The combination with an X-ray machine having an X-ray tube mounted for adjustment toward and away from a film, of a focusing device for the rays comprising an apertured diaphragm of material impervious to the rays, means for varying the aperture of the diaphragm, a scale member visible from without said device and an index member, one of said members being movable with respect to the other by said aperture varying means, said index and scale members having cooperating indicia thereon for giving the dimensions of exposure on the film corresponding to the size of aperture of the diaphragm and the distance of the target to the film.

11. The combination with an X-ray machine having an X-ray tube mounted for adjustment toward and away from a film and having a variable apertured diaphragm, means for varying the aperture of the diaphragm, and means at least a part of which is movable with said first-named means for indicating the dimensions of the exposure with relation to the distance of the target to the film.

12. The combination with a radiographic machine including an X-ray tube having a target and mounted for adjustment toward and away from a sensitized surface, of means interposed between said target and surface for controlling the area of surface exposed to said target, illuminating means for illuminating the central spot of the area to be exposed to the target carried by an element adapted to occupy two different positions, one position wherein the illuminating means is in the path of the X-ray beam and another position wherein the illuminating means is outside said beam, and a circuit control for said illuminating means which is operated by said element when it moves into and out of the position wherein the illuminating means is disposed in the path of the beam.

13. The combination with a radiographic machine including an X-ray tube having a target and mounted for adjustment toward and away from a sensitized surface, of means interposed between said target and said surface for controlling the area of surface exposed to the target and scale means operatively connected with said area controlling means for operation in unison therewith for indicating the relative dimensions of the exposure.

14. The combination with a radiographic machine including an X-ray tube having a target and mounted for adjustment toward and away from a sensitized surface, of a device interposed between said target and surface for controlling the area of surface exposed to said target, means carried by said device for controllably illuminating a spot of the area to be exposed to the target, including an auxiliary lamp which is movable to two positions, one position in which it is inoperative to illuminate said spot and the other position in which it illuminates said spot, and means operative by the act of moving said lamp to and from its illuminating position to control the illumination of the lamp.

15. The combination with a radiographic machine including an X-ray tube having a target mounted and adjusted toward and away from a sensitized surface, an open frame interposed between said target and said surface with an iris diaphragm mounted within said frame for controlling the area of surface exposed to the target, an arm pivoted to said frame and shaped to conform generally with the shape of said frame, said arm carrying an auxiliary lamp for controllably illuminating a spot of the area to be exposed, said arm being movable about its pivot from a position following generally said frame to a crosswise position with the auxiliary lamp disposed in alignment with the opening of the iris diaphragm, and an electric switch which is controlled by said arm to illuminate said lamp when it reaches the desired crosswise position.

GEORGE L. STORM.